US 011566688B2

(12) United States Patent
Duffy

(10) Patent No.: US 11,566,688 B2
(45) Date of Patent: Jan. 31, 2023

(54) BELT TENSIONER

(71) Applicant: Schaeffler Technologies AG & Co. KG, Herzogenaurach (DE)

(72) Inventor: Ryan Duffy, Berkley, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 289 days.

(21) Appl. No.: 17/074,686

(22) Filed: Oct. 20, 2020

(65) Prior Publication Data
US 2022/0120338 A1 Apr. 21, 2022

(51) Int. Cl.
| F16H 7/12 | (2006.01) |
| F16H 7/24 | (2006.01) |
| F02B 67/06 | (2006.01) |
| F16H 7/08 | (2006.01) |
| F16H 7/02 | (2006.01) |

(52) U.S. Cl.
CPC ............ *F16H 7/1281* (2013.01); *F02B 67/06* (2013.01); *F16H 7/24* (2013.01); *F16H 7/02* (2013.01); *F16H 2007/0802* (2013.01); *F16H 2007/0874* (2013.01); *F16H 2007/0893* (2013.01); *F16H 2007/0897* (2013.01)

(58) Field of Classification Search
CPC ...... F16H 7/18; F16H 7/24; F16H 2007/0874; F16H 2007/0878
USPC ................................................. 474/130, 134
See application file for complete search history.

(56) References Cited

U.S. PATENT DOCUMENTS

| 4,869,708 | A | * | 9/1989 | Hoffmann | F01L 1/022 474/140 |
| 5,256,113 | A | * | 10/1993 | Bushman | F02B 67/06 474/135 |
| 5,653,654 | A | * | 8/1997 | Davis | F16H 7/24 474/119 |
| 6,955,622 | B2 | * | 10/2005 | Bachmair | F01L 1/46 474/140 |
| 8,397,363 | B2 | * | 3/2013 | Fukatani | F16H 7/24 269/1 |
| 10,738,862 | B2 | * | 8/2020 | Maeda | F16H 7/08 |
| 2004/0002400 | A1 | * | 1/2004 | Ellis | F16H 7/24 474/130 |
| 2004/0180745 | A1 | * | 9/2004 | Dinca | F16H 7/24 474/134 |
| 2015/0080159 | A1 | * | 3/2015 | Johnson | F16H 7/08 474/139 |
| 2019/0078667 | A1 | * | 3/2019 | Liu | F16H 7/24 |

* cited by examiner

*Primary Examiner* — Henry Y Liu

(57) ABSTRACT

A belt tensioner for an engine accessory drive is installed over a pulley such that rollers extend toward the engine. Due the belt being between the tensioner and the engine, installation of the belt on the pulley is difficult. To simplify installation, a removable belt guide is included in the belt tensioner. Two methods of installing the belt and tensioner are envisioned. In a first method, the belt is first installed on the pulley and the belt guide holds the belt toward the pulley radially as the tensioner is installed over the pulley. In a second method, the belt is first installed to the tensioner and the guide holds the belt radially away from the pulley as the tensioner is installed over the pulley. In both methods, the belt guide is removed after the belt and tensioner are installed.

13 Claims, 4 Drawing Sheets

BELT TENSIONER

TECHNICAL FIELD

The disclosure pertains to the general area of belt tensioners for engine accessory drives. More particularly, the disclosure pertains to use of a belt guide during installation of a belt tensioner with inward facing rollers.

BACKGROUND

It is common for an automotive engine to provide power to a number of accessory devices via a belt. The accessories may include alternators, air conditioning compressors, power steering pumps, etc. A common type of accessory drive system utilizes a flexible belt that is routed around a series of pulleys. One pulley is mounted to the crankshaft and other pulleys are mounted to each accessory device. Some portions of the belt are in tension as a result of the transmission of power. For portions of the belt that are not placed in tension by the transmission of power, a tensioner may be utilized. The tensioner exerts a normal force against the belt.

There are some types of accessories that generate power in some circumstances and consume power in other circumstances. As a result, the portion of the belt that requires tensioning may change from one operating condition to another. In such systems, the tensioner must be capable of exerting force on multiple belt portions.

To minimize parasitic drag, the normal force is typically applied via a roller that is supported to rotate with respect to a movable arm of the tensioner. Some tensioners utilize a roller that is supported from the end that is closest to the engine. Tensioners with outward facing rollers are installed before the belt is installed. In some conditions, there is not enough space to support the roller in this fashion, so inward facing rollers are used.

SUMMARY

A method of installing an engine-driven accessory utilizes a removable belt guide. A belt tensioner has a first side and a second side. The tensioner includes at least one roller on the first side and the removable belt guide. The process includes installing a belt around a first pulley, positioning the belt tensioner over the first pulley, and removing the belt guide from the second side of the belt tensioner. The belt tension is positioned over the first pulley such that the belt guide radially positions the belt relative to the first pulley. The belt tension may include a pin which holds the at least one roller in a released condition. This pin, if present, is removed after positioning the belt tensioner over the first pulley. The pin may be fixed to the belt guide such that removing the belt guide and removing the pin is a single action. Installing the belt around the first pulley may occur before positioning the belt tensioner over the pulley. The belt guide may radially position the belt relative to the first pulley by limiting radial movement of the belt away from the pulley. In another embodiment, the belt may be routed around the belt guide before positioning the belt tensioner over the first pulley and installed around the first pulley after removing the belt guide from the second side of the belt tensioner. The belt may be installed around a second pulley before removing the belt guide from the second side of the belt tensioner.

A belt tensioner includes a frame, at least one arm, at least one spring, and a belt guide. The frame is adapted for fixation to an engine over a pulley. Each of the at least one arms has a roller. In an installed state, each arm is supported to move relative to the frame. The roller extends in a first direction from the frame. In the installed state, the at least one spring is configured to move the at least one arm such that the respective roller rolls against a belt wrapped around the pulley and apply tension to the belt. The belt guide is configured to position the belt radially with respect to the pulley. The belt guide is removable in a second direction opposite the first direction. The belt guide may hold the tensioner in a released state in which the spring does not move the at least one arm. The frame and the at least one arm may define a hole. The belt guide may include a plurality of post extending into the hole. The belt tensioner have two arms and the spring may be configured to force the respective rollers toward each other to pinch the belt.

A belt tensioner includes a frame, first and second arms, at least one spring, and a belt guide. The frame is adapted for fixation to an engine over a pulley. The first arm has a first roller and a second arm has a second roller. The first and second rollers extending a first direction from the frame. In an installed state, the spring is configured to move the first and second rollers toward one another to apply tension to a belt wrapped around the pulley. The belt guide is configured to position the belt radially with respect to the pulley. The belt guide is removable in a second direction opposite the first direction. The belt guide may hold the tensioner in a released state in which the spring does not move the first and second arms. The frame, the first arm, and the second arm may define a hole. The belt guide may includes a plurality of post extending into the hole.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
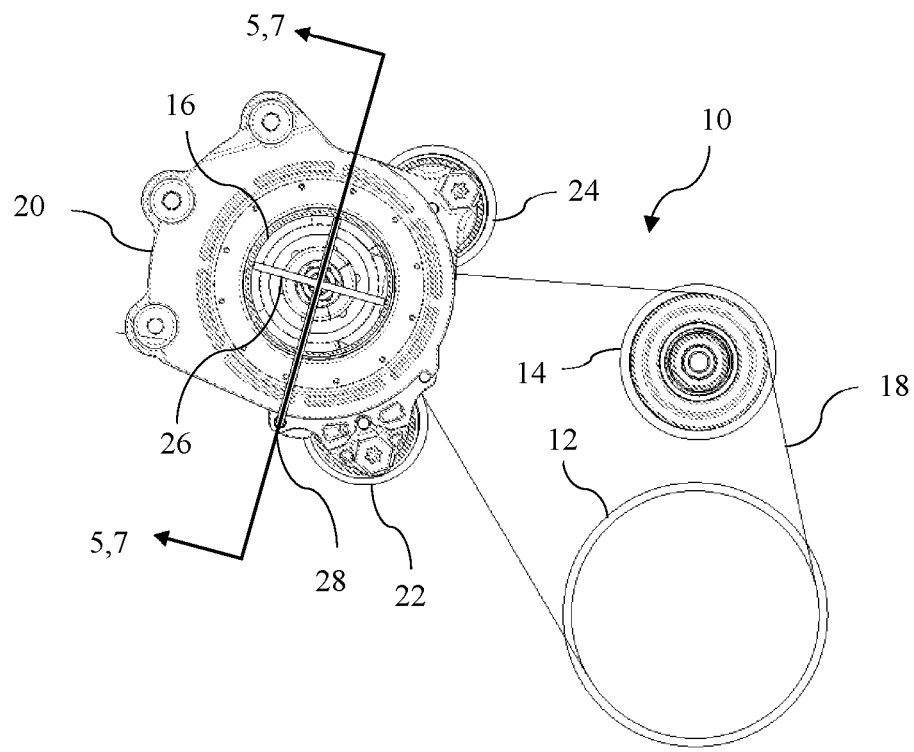
FIG. 1 is a front view of an automotive front end accessory drive system.

FIG. 1 shows an automotive engine front end accessory drive system 10. A first pulley 12 is fixed to the engine crankshaft. A second pulley 14 drives an accessory such as an air conditioning compressor. A third pulley 16 is fixed to a reversible electrical machine. In most operating conditions, power is transmitted from pulley 12 to pulleys 14 and 16 by belt 18. In these operating conditions, the reversible electrical machine operates as a generator to provide power to electrical equipment and to recharge a battery. If the pulleys rotate clockwise, then the belt segments between pulley 12 and pulley 14 and between pulley 14 and pulley 16 are placed in tension by the transmission of power. The segment between pulley 16 and pulley 12 would not be under tension due to power transmission. Tensioner 20 is installed around pully 16 to ensure that all segments of the belt are under tension. Tensioner 20 accomplishes this by applying a normal force to the belt via roller 22.

During certain operating conditions, such as engine starting, the power flow changes. The reversible electrical machine is used as a motor to bring the engine up to speed. During engine starting, it is the segment between pulleys 14 and 16 that is not in tension due to power transmission. Tensioner 20 maintains the segment in tension by applying a normal force to the belt via roller 24.

The normal forces are supplied by a spring which tends to push rollers 22 and 24 toward one another. During assembly of the accessory drive system, this spring force would make it difficult to install tensioner 20. To simplify assembly, a belt guide 26 is used. The belt guide simplifies installation in two ways. First, as will be discussed in more detail below, the belt guide holds the belt in position radially with respect to pulley 16. Second, part of belt guide 26 is inserted into a hole 28 in a way that holds rollers 22 and 24 apart against the spring force.

Figure 2:
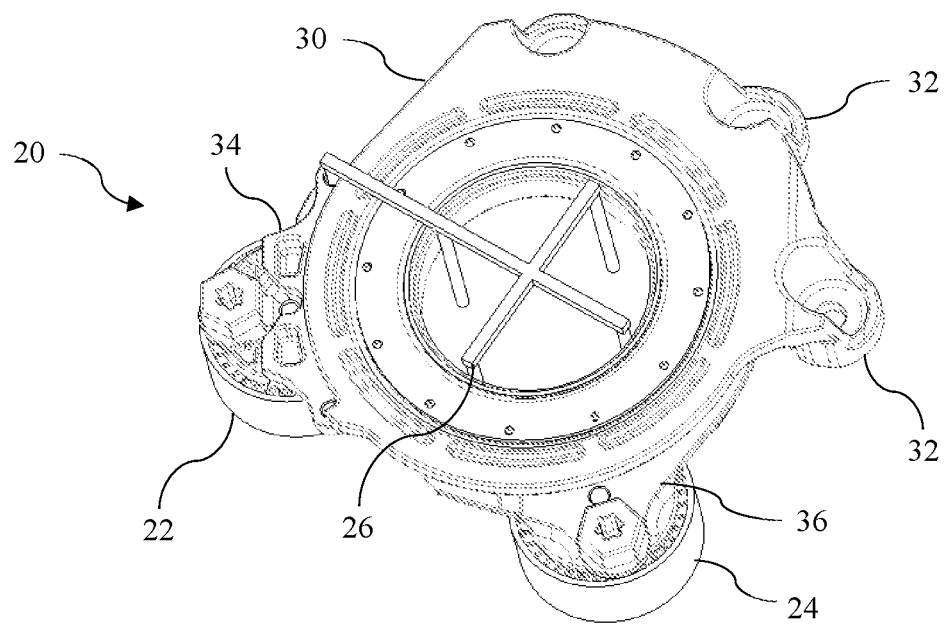
FIGS. 2 and 3 are pictorial views of a belt tensioner of the accessory drive system of FIG. 1.
Figure 3:
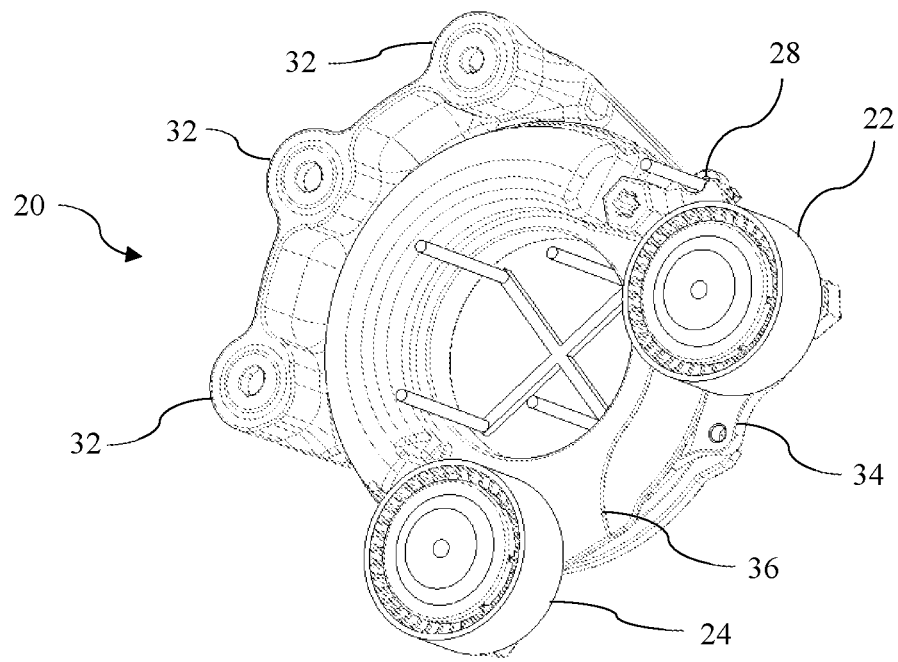

FIGS. 2 and 3 show tensioner 20 from an outward side and an inward side respectively. Tensioner 20 includes a frame that is mounted to the electrical machine via a series of mounting lugs 32. Since the reversible electric machine is firmly mounted to the engine, the frame is indirectly fixed to the engine. Two arms 34 and 36 are supported to rotate with respect to the frame. Rollers 22 and 24 and supported to rotate with respect to arms 34 and 36 respectively. Hole 28 extends through arms 34 and 36.

Figure 4:
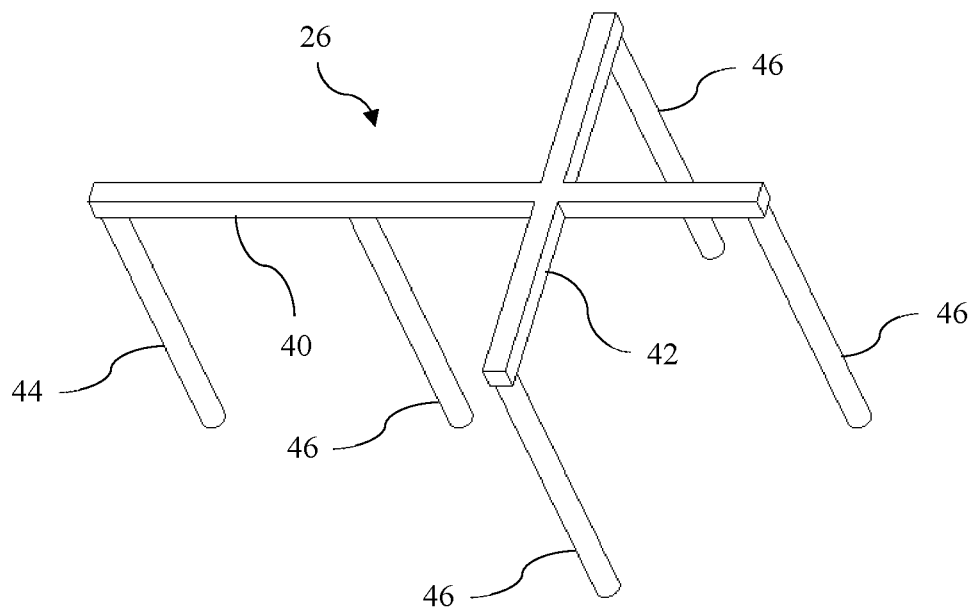
FIG. 4 is a pictorial view of a belt guide of the belt tensioner of FIGS. 2 and 3.

FIG. 4 shows the belt guide 26 in more detail. The belt guide includes two cross pieces 40 and 42. First pin 44 extends from cross piece 40 at one end. First pin 44 is the portion of the belt guide that fits into hole 28 to hold the arms in an extended position. A set of second pins 46 extend from the cross pieces and fit around pulley 16 when the tensioner is installed to position the belt radially relative to the pulley.

Figure 5:
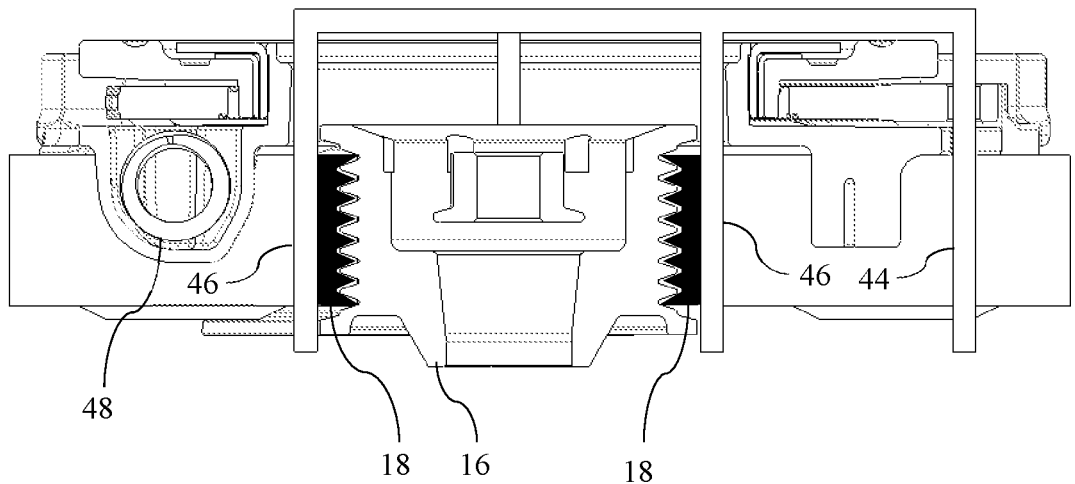
FIG. 5 is a cross sectional view of the tensioner, belt, and pulley of FIG. 1 during an intermediate stage of assembly according to a first method of assembly.

FIG. 5 is a cross sectional view of the tensioner and pulley after the tensioner has been fastened to the engine, but before the belt guide has been removed. Spring 48, which forces the rollers toward one another is visible in this view, although the rollers are held apart by pin 44. Notice that the pins 46 are radially outside of the belt 18, trapping the belt between the pins 46 and the pulley 16. At this point during the assembly process, the belt is not yet in tension, so failure to constrain its movement would lead to the possibility of it moving out of position relative to the pulley. Since that portion of the belt is difficult to see, an incorrectly positioned belt may go undetected.

Figure 6:
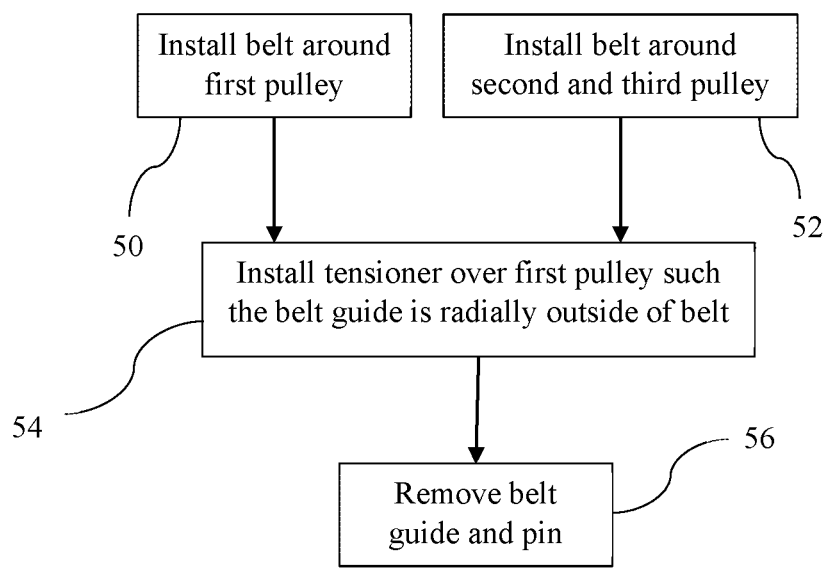
FIG. 6 is a flowchart for the first method of assembly.

FIG. 6 is a flow chart for a process of assembling the accessory drive system. At 50, the belt is positioned around pulley 16. At 52, the belt is positioned around pulleys 12 and 14. The sequence of performing steps 50 and 52 is not important. After the belt is positioned around all of the pulleys, at 54, the tensioner is installed over pulley 16 such that the belt guide is radially outside of the belt, as shown in FIG. 5. After the tensioner is fastened to the engine, the belt guide is removed at 56. Removing the belt guide includes removing pin 44 which had been holding the rollers apart. Once pin 44 is removed, the rollers place the belt in tension.

Figure 7:
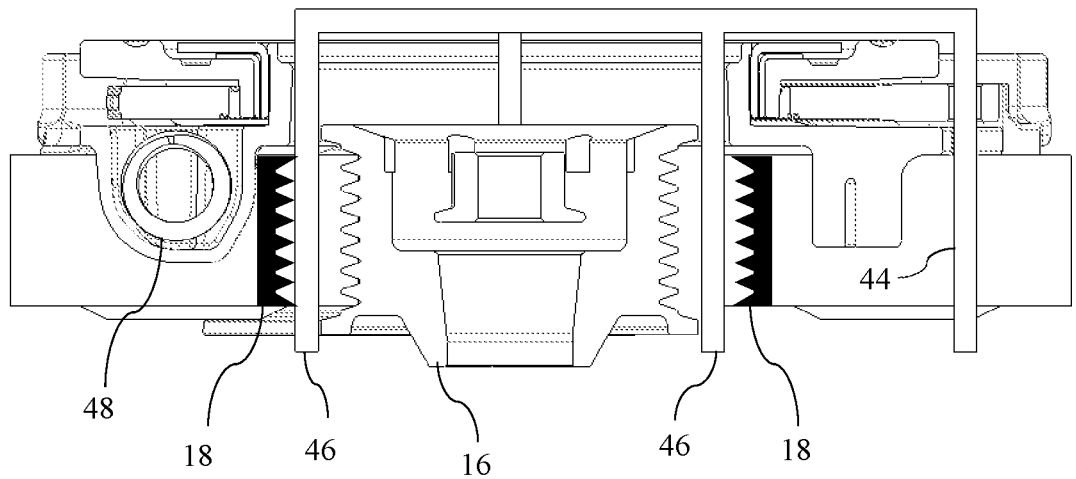
FIG. 7 is a cross sectional view of the tensioner, belt, and pulley of FIG. 1 during an intermediate stage of assembly according to a second method of assembly.

FIG. 7 is a cross sectional view of the tensioner and pulley after the tensioner has been fastened to the engine, according to an alternative method of assembly. In the alternative method, the belt is temporarily fixed to the tensioner prior to the tensioner being installed on the engine. In this alternative method, the pins 46 are radially inside of the belt 18, trapping the belt between the pins 46 and an inner surface of the tensioner.

Figure 8:
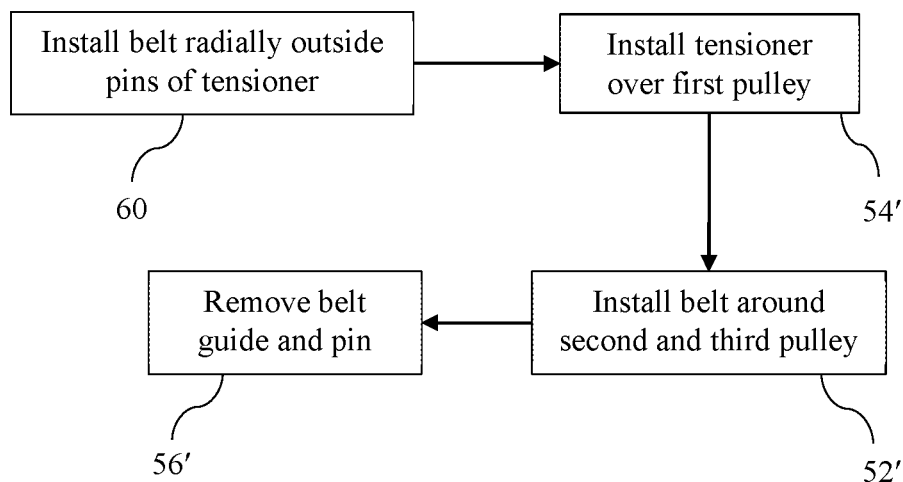
FIG. 8 is a flowchart for the second method of assembly.

FIG. 8 is a flow chart for this alternative process of assembling the accessory drive system. At 60, the belt is installed onto the tensioner radially outside pins 46 as shown in FIG. 7. Then, at 54', the tensioner is installed over pulley 16. At 52', the belt is routed around pulleys 12 and 14. At 56', the belt guide is removed. In addition to allowing the spring to force the pulleys toward one another, this also releases the belt to contract onto pulley 16.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:
1. A method of installing an accessory comprising:
   providing a belt tensioner having a first side and a second side, the tensioner including at least one roller on the first side and having a removable belt guide;
   installing a belt around a first pulley;

positioning the belt tensioner over the first pulley such that the belt guide radially positions the belt relative to the first pulley; and after positioning the belt tensioner over the first pulley, removing the belt guide from the second side of the belt tensioner.

2. The method of claim 1 further wherein the belt tension includes a pin which holds the at least one roller in a released condition and wherein the method further comprises removing the pin after positioning the belt tensioner over the first pulley.

3. The method of claim 2 wherein the pin is fixed to the belt guide such that removing the belt guide and removing the pin is a single action.

4. The method of claim 1 wherein:

installing the belt around the first pulley occurs before positioning the belt tensioner over the pulley; and the belt guide radially positions the belt relative to the first pulley by limiting radial movement of the belt away from the pulley.

5. The method of claim 1 further comprising routing the belt around the belt guide before positioning the belt tensioner over the first pulley and wherein installing the belt around the first pulley occurs after removing the belt guide from the second side of the belt tensioner.

6. The method of claim 1 further comprising installing the belt around a second pulley before removing the belt guide from the second side of the belt tensioner.

7. A belt tensioner comprising:

a frame adapted for fixation to an engine over a pulley;

at least one arm, each arm having a roller, the arm supported to move, in an installed state, relative to the frame, the roller extending in a first direction from the frame;

at least one spring configured to, in the installed state, move the at least one arm such that the respective roller rolls against a belt wrapped around the pulley and apply tension to the belt; and a belt guide configured to position the belt radially with respect to the pulley, the belt guide being removable in a second direction opposite the first direction.

8. The belt tensioner of claim 7 wherein the belt guide holds the tensioner in a released state in which the spring does not move the at least one arm.

9. The belt tensioner of claim 7 wherein:

the frame and the at least one arm define a hole; and the belt guide includes a plurality of post extending into the hole.

10. The belt tensioner of claim 7 wherein the at least one arm comprises two arms and the spring is configured to force the respective rollers toward each other to pinch the belt.

11. A belt tensioner comprising:

a frame adapted for fixation to an engine over a pulley;

a first arm having a first roller and a second arm having a second roller, the first and second rollers extending in a first direction from the frame;

at least one spring configured to, in an installed state, move the first and second rollers toward one another to apply tension to a belt wrapped around the pulley; and a belt guide configured to position the belt radially with respect to the pulley, the belt guide being removable in a second direction opposite the first direction.

12. The belt tensioner of claim 11 wherein the belt guide holds the tensioner in a released state in which the spring does not move the first and second arms.

13. The belt tensioner of claim 11 wherein:

the frame, the first arm, and the second arm define a hole; and the belt guide includes a plurality of post extending into the hole.

* * * * *